(12) United States Patent
Houser et al.

(10) Patent No.: US 7,568,711 B2
(45) Date of Patent: Aug. 4, 2009

(54) ECCENTRIC-BASED CASTER ADJUSTMENT APPARATUS

(76) Inventors: John Abbott Houser, 1771 Kauffman Rd., Marion, OH (US) 43302; Jeffrey David Houser, 3134 County St., Green Camp, OH (US) 43322

( * ) Notice: Subject to any disclaimer, the term of this patent is extended or adjusted under 35 U.S.C. 154(b) by 468 days.

(21) Appl. No.: 11/266,697

(22) Filed: Nov. 3, 2005

(65) Prior Publication Data
US 2007/0096418 A1    May 3, 2007

(51) Int. Cl.
*B62D 17/00* (2006.01)
(52) U.S. Cl. ............... 280/86.756; 280/86.751; 280/86.754; 280/86.757
(58) Field of Classification Search .......... 280/86.751, 280/86.753, 86.754, 86.756, 86.757; *B62D 17/00*
See application file for complete search history.

(56) References Cited

U.S. PATENT DOCUMENTS

| 2,438,358 | A | * | 3/1948 | Castiglia | 33/203.12 |
|---|---|---|---|---|---|
| 2,502,744 | A | * | 4/1950 | Parker | 280/86.757 |
| 2,507,108 | A | * | 5/1950 | Lange | 280/86.756 |
| 2,544,331 | A | * | 3/1951 | Kogstrom | 280/86.754 |
| 2,605,118 | A | * | 7/1952 | Booth et al. | 280/86.756 |
| 2,631,865 | A | * | 3/1953 | Hoffman | 280/93.512 |
| 2,664,297 | A | * | 12/1953 | Booth | 280/86.757 |
| 2,855,212 | A | * | 10/1958 | Houser | 280/6.157 |
| 2,900,196 | A | * | 8/1959 | Nienke | 280/86.756 |
| 2,923,555 | A | * | 2/1960 | Kost et al. | 280/86.756 |
| 3,147,025 | A | * | 9/1964 | Good | 280/86.754 |
| 4,252,338 | A | * | 2/1981 | Ingalls et al. | 280/86.756 |
| 4,400,007 | A | * | 8/1983 | Ingalls | 280/86.756 |
| 4,420,272 | A | * | 12/1983 | Ingalls et al. | 403/4 |
| 4,519,626 | A | * | 5/1985 | Murphy et al. | 280/86.754 |
| 4,641,853 | A | * | 2/1987 | Specktor et al. | 280/86.756 |
| 4,650,208 | A | * | 3/1987 | Mason | 280/86.757 |
| 4,831,744 | A | * | 5/1989 | Specktor et al. | 33/600 |
| 4,921,271 | A | * | 5/1990 | Berry et al. | 280/86.756 |
| 4,970,801 | A | * | 11/1990 | Specktor et al. | 33/600 |

* cited by examiner

*Primary Examiner*—Paul N Dickson
*Assistant Examiner*—Laura Freedman
(74) *Attorney, Agent, or Firm*—Mueller Smith & Okuley, LLC (57) ABSTRACT

Apparatus for adjusting the caster of the steering wheels of an all terrain vehicle. An eccentric threaded stud support is adjustively rotatable to position the eccentrically retained stud at a plurality of caster angle defining orientations extending from zero caster negatively or positively. Perceptible indicia identifies each caster incremental location.

19 Claims, 5 Drawing Sheets

ECCENTRIC-BASED CASTER ADJUSTMENT APPARATUS

CROSS-REFERENCE TO RELATED APPLICATIONS

STATEMENT REGARDING FEDERALLY SPONSORED RESEARCH

Not applicable.

BACKGROUND OF THE INVENTION

In 1967 the American counterpart to a global motorcycle manufacturer requested the development of a vehicle that its dealers could sell during the winter season of slackening motorcycle sales. The result was the introduction of a three-wheeled all terrain vehicle (ATV) which debuted in 1970. This original ATV exhibited a tricycle geometry and employed a seven horsepower motorcycle engine to drive two rear twenty-two inch low pressure tires through a dual-range, four-speed gear box with an automatic clutch. The machines handled snow, mud and various slippery conditions which a motorcycle couldn't.

Further development optimized tire and chassis design. While then primarily a recreational device, farmers saw substantial utility in the ATV. In this regard, a farm tractor costs exponentially more than an ATV and a typical ATV utilized 8% of the fuel consumed by such a tractor. This multipurpose usage grew from about 30% of total usage to about 80% total usage in the current market. The other major ATV interest in the 1980s was racing everywhere from frozen lakes in the East to Western dessert to the dirt ovals of Middle America. Four-wheel machines were introduced in 1984 and were considered more versatile, particularly for utilitarian use. Inevitable accident statistics prompted the Consumer Product Safety Commission (CPSC) to mandate a four-wheel design. By 2001, the ATV industry was selling about 400,000 units per year.

Three basic types of ATVs have evolved to suit the needs of riders. These include: sport models referred to as "sport quads" which are used by high performers, for instance, in racing and to some extent by casual recreationists; utility models used for a wide range of work and recreation activities; and the smallest segment featuring a cargo box which are popular with farmers, ranchers and outfitters.

Utility models typically incorporate four-wheel drive and will weigh about 400-500 pounds. Sport quads incorporate two-wheel drive, somewhat expensive suspensions and more refined motors. Typically weighing about 370 pounds, these sport vehicles are quicker and more responsive than the utility models. Just as in essentially all forms of automotive racing, the talent of the driver is quite important. For instance, with two-wheel drive, when beginning a turn, a bit more throttle is employed and a slight "slide" of the rear wheels is developed. Thus the type of terrain on which the vehicles are driven has a high importance with respect to racing technique and generally varies from racing venue-to-venue.

As may be expected, sport quad racing also calls for a tuning of front end suspension which is characterized preferably with optimization for each track. For instance, the two front wheels are suspended from ball joints, in turn supported by upper and lower A-frames or control frames pivotally mounted to the chassis with rod end Heim joints. For a highest level of performance at each racing venue, experienced mechanics will adjust these suspensions for caster and camber. Caster is the angle between a vertical line and the ATV's steering axis when viewed from the side. It is measured in degrees and minutes. More caster (positive) generally gives more steering going into a turn, but less coming out. The opposite also obtains, less caster (negative) gives less steering going into a turn (initial steering), but more steering as the vehicle exits. Caster also may be adjusted to provide more stability on straightaway performance.

Camber, as seen from the front and rear of the ATV is the angle of the tires in relation to the ground. Tires that are perfectly perpendicular to the ground (90°) are said to be at "zero camber". If the tops of the tires lean toward each other, the tires have negative camber, and if they lean out, the tires have positive camber.

While camber can be tuned by bolt and nut adjustment at the upper ball joint, caster cannot. Typically, caster is adjusted by removing the upper A-frame structure and making an adjustment at the rod end Heim joint. Unfortunately, that form of adjustment also affects camber. Accordingly, a substantial amount of talent is required for making a caster adjustment. Assuming adjustments have been made for given racing venue, the inherent structure of the front wheel suspensions are such that it is difficult to determine just what adjustment has been made as the vehicle is tuned for a next racing venue.

BRIEF SUMMARY OF THE INVENTION

The present invention is addressed to apparatus for independently adjusting the caster and camber of the forward wheels of an all terrain vehicle. Adjustment is carried out through utilization of a rotatable ball joint threaded stud support having an eccentric stud-receiving open shaft. The stud support is configured to slideably rotate within the cylindrical cavity of a support member welded to the apex of an upper control arm or A-arm which is pivotally attached to the vehicle frame. To retain the stud support at a selected caster-defining location, an indexing assembly is provided with mutually cooperative components adjustably engageable to rotatably position and fix the stud support at a select one of a plurality of caster-defining orientations. Visually perceptible indicia are provided identifying each orientation. For example, a numerical array may be employed wherein a number is positioned adjacent each indexing component.

While a variety of indexing approaches may be employed with the eccentric-based system, that preferred configures the stud support as having a cylindrical body portion nestable within the support cavity with an outwardly disposed annular flange which is slideably positionable over an adjacent edge of the fixed support member. An upper arcuate array of pin-receiving bores is formed within the flange, each bore of which may be positioned over a locking pin extending from an edge of the fixed support member. One bore of the array is positioned to define caster as it is present when the vehicle is received from the manufacturer (OEM), while a plurality of bores on either side of it define constant angular increments of positive and negative caster. For instance, those increments may be about 0.4 degrees. The OEM based caster position is identified as a zero.

The eccentric ball joint stud support is retained in position by a circular retainer disc which rotates with the stud support and is configured with a retainer opening corresponding with the eccentric opening such that the threaded stud may pass through it and receive a locking nut. Advantageously, the locking nut need not be removed from the stud to carry out a caster adjustment. This locking feature assures the maintenance of camber when adjusting caster. Because each caster orientation is associated with a visible indicia such as a number, the operator of the vehicle may record optimum caster for each racing venue and readily adjust caster with little expenditure of time and effort.

Other objects of the invention will, in part, be obvious and will, in part, appear hereinafter.

The invention, accordingly, comprises the apparatus possessing the construction, combination of elements and arrangement of parts which are exemplified in the following detailed description.

For a fuller understanding of the nature and objects of the invention, reference should be had to the following detailed description taken in connection with the accompanying drawings.

DETAILED DESCRIPTION OF THE INVENTION

Figure 1:
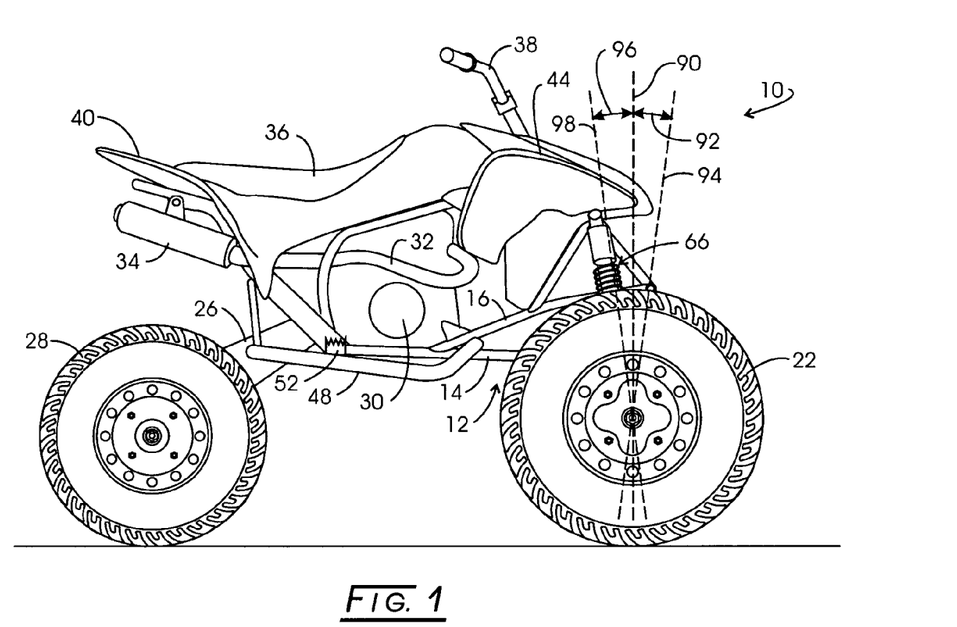
FIG. 1 is a side view of a sport quad all terrain vehicle.

Referring to FIG. 1, a quad sport-type all terrain vehicle (ATV) is represented generally at 10. Vehicle 10 is configured with a tubular frame represented generally at 12, one component of which is represented at 14 and another such component is seen at 16. Components 14 and 16 are at the right side of vehicle 10. Looking additionally at FIG. 2, complimentary frame components are seen respectively at 18 and 20 as are associated with the left side of the vehicle. These figures reveal right and left forward wheels 22 and 24 which are freely rotatable. A rearwardly directed swing arm 26 (FIG. 1) supports a driven axle along with right and left rear drive wheels, the right drive wheel being seen at 28. The diameter of wheels as at 28 is less than that of the front wheels but generally will exhibit a wider geometry.

Frame 12 further supports a motor represented schematically at 30 in FIG. 1. Motor 30 incorporates an exhaust pipe 32 which extends rearwardly to a muffler 34. Above the motor 30, the frame 12 supports a rather elongate seat 36 and forwardly thereof handlebars 38. Looking additionally to FIG. 2, associated with the seat 36 are rear fairings 40 and 42 which function somewhat as a rear fender. Correspondingly, front fenders are defined at 44 and 46. Associated with seat 36 are right and left foot safety frames 48 and 50 which typically support a polymeric web as well as foot rests, one of which is shown in FIG. 1 at 52. In general, the technique of driving vehicles as at 10 as in all vehicle racing involve a talent of the driver. For all terrain vehicles particularly of a sporting variety, driver position is used in vehicle control.

Figure 2:
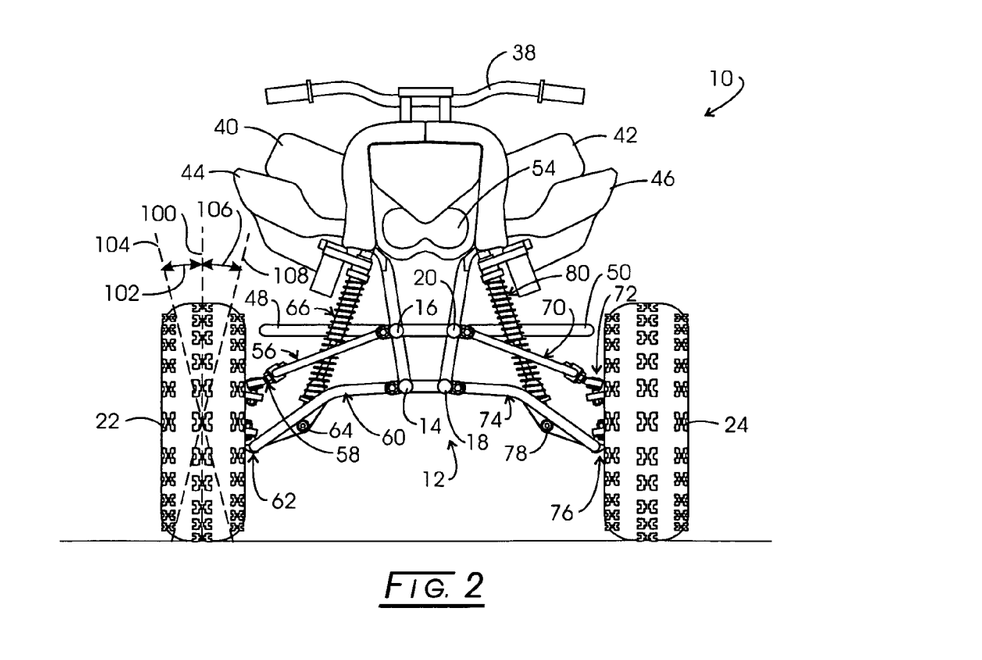
FIG. 2 is a front view of the vehicle shown in FIG. 1.

FIG. 2 reveals frame supported headlights 54 and the general features of the suspension associated with front wheels 22 and 24. In the latter regard, wheel 22 is supported inter alia, by an upper control arm represented generally at 56. Configured as a tubular A-arm, device 56 is pivotally mounted to brackets coupled to frame member 16 and extends to a ball joint assembly represented generally at 58. Wheel 22 also is supported by a lower control arm represented generally at 60 which is pivotally supported from brackets attached, in turn, to frame member 14. Device 60 extends to a ball joint assembly represented generally at 62 and is configured with a connector assembly 64 (sometimes referred to as a knuckle or spindle) which, in turn, is attached to a coil over shock absorber assembly represented generally at 66, the upper portion of which is attached to frame 12.

In identical fashion, left front wheel 24 is suspended, inter alia, by an upper control arm represented generally at 70 which is pivotally coupled to brackets connected to frame member 20 and extends to an upper ball joint assembly represented generally at 72. A lower control arm is represented generally at 74 which is pivotally attached to brackets extending from frame member 18 and extends, in turn, to a lower ball joint assembly represented generally at 76. Control arm 74 also is configured with a connector assembly 78 which, in turn, is coupled to the lower end of a coil over shock absorber assembly represented generally at 80.

Caster adjustment essentially is a relationship between the upper and lower ball joint assemblies and is an adjustment for control stability of the vehicle. Returning to FIG. 1, zero caster is represented by vertical dashed line 90 extending through the turn axis of wheel 22. Positive caster adjustment is represented by arrow defined angle 96 and dashed line 98. On the other hand, negative caster is represented at arrow defined angle 92 and dashed line 94. With negative caster, the vehicle is more stable in a straightaway operation but it is harder to steer into a turn. On the other hand, a positive caster adjustment enhances the stability of the vehicle when steering through a turn. Accordingly, it is apparent that as these vehicles are raced in different venues, convenience adjusting caster as well as the opportunity to be able to accurately repeat these adjustments will be quite beneficial.

Returning to FIG. 2, a zero camber is represented at dashed line 100. A positive camber is represented by arrow-defined angle 102 and dashed line 104. Correspondingly, a negative camber is represented by arrow-defined angle 106 and dashed line 108.

Figure 3:
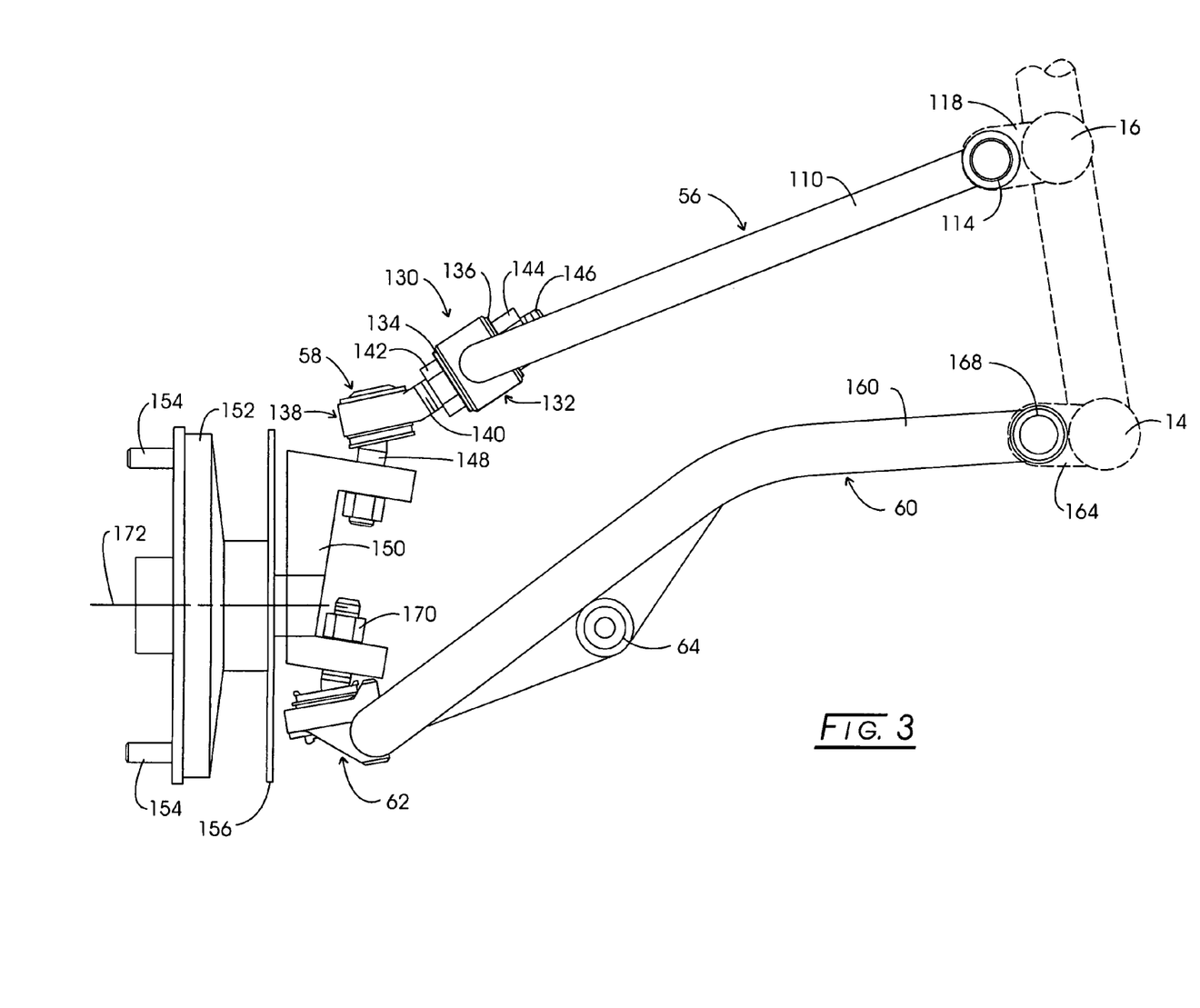
FIG. 3 is a partial side view of the control arm suspension of the vehicle of FIG. 1.

Referring to FIG. 3, upper control arm 56 and lower control arm 60 reappear in an enlarged partial front view. In the figure, the forward leg of upper control arm 56 is shown at 110 extending from a pivot connection 114. Connection 114, in turn, is coupled to a bracket 118 welded to frame member 16. Pivot connection 114 may, for example, be configured with bearings, bushings or the like. Accordingly, no adjustment is made or can be made at that pivoting location. Forward arm 110 extends to welded connection with one side of the eccentric-based caster/camber adjustment apparatus of the invention as represented generally at 130. Connection is seen to be made with the support assemblage thereof represented generally at 132. Abuttably positioned against the forward edge surface of assemblage 132 is the flange portion 134 of an eccentric-based stud support. A disc-shaped retainer member 136 which also carries an eccentric opening is engaged adjacent the inward edge of support assemblage 132. Ball joint assembly 58 is seen to be configured with a ball joint portion represented generally at 138 to which is rigidly connected a threaded stud 140. A jam or adjusting nut 142 is threadably engaged with stud 140 and is seen to be compressively urged against the outer surface of the stud support inwardly from its flange portion 134. An inwardly disposed lock nut 144 is tightened against the disc-shaped retainer member 136 to complete the assembly. Note that the stud 140 extends to an inward end 146.

Returning to ball joint 58, its pivotal connector 148 is seen to be bolted to a spindle 150. Spindle 150, in turn, supports rotatable hub 152 from which an array of studs project, two of which are shown at 154. A rotor 156 also rotates with the hub 152.

Looking to lower control arm 60, a forward leg 160 thereof is seen to be coupled with frame member 14 at a bracket 164 extending therefrom. A pivot as at 168 may incorporate bearings, bushings or the like. Arm 60 extends to one side of the ball joint assembly 62. That assembly includes a pivotal connector 170 which is coupled by a nut with the lower side of spindle 150. Hub 152 rotates about a spindle axis represented at 172. It is this axis which is intersected by vertical dashed line 90 as described in connection with FIG. 1.

Figure 4:
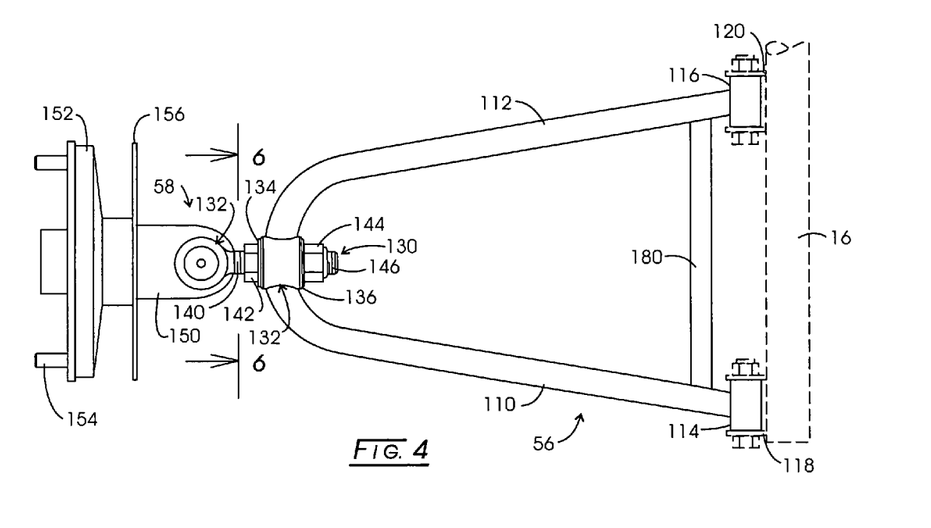
FIG. 4 is a top view of the upper control arm of the vehicle of FIG. 1.

Referring to FIG. 4, a top view of upper control arm 56 is presented. Configured as an A-arm, device 56 is formed with forward and rearward legs 110 and 112 which extend from connection with pivots shown respectfully at 114 and 116. Those pivots are connected via respective brackets 118 and 120 to frame member 16. Arm 56 is reinforced with a cross member 180 and the legs 110 and 112 are seen to extend to an attachment location where they are attached to support member 132. Threaded stud 140, jam nut 142, flange portion 134, retainer disc 146 and lock nut 144 again are presented but in top view fashion. Both camber and caster are adjusted with the recited combination of elements and the adjustment of caster will not affect the pre-existing camber adjustment. The caster can be changed without completely disassembling the unit. Thus caster may be quickly adjusted, for example, during racing pit stops without turning off the vehicle motor.

Figure 5:
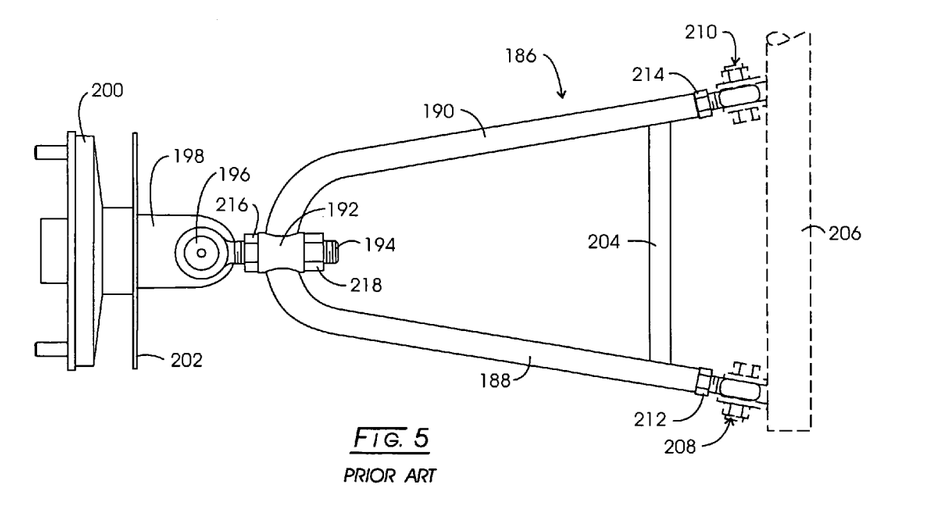
FIG. 5 is a top view of an upper control arm for an all terrain vehicle configured with a commonly encountered caster and camber adjustment arrangement.

Referring to FIG. 5, a more prevalent approach to structuring and mounting an upper control arm is represented in general at 186. Configured as an A-arm, device 186 incorporates legs 188 and 190, which are joined together at a ball joint support 192. Support 192 retains a threaded stud 194 which is fixed to a ball joint 196. As before, ball joint 196 is pivotally coupled with a spindle 198 which, in turn, supports a freely rotatable hub 200. A rotor is shown at 202 which rotates with hub 200. Legs 188 and 190 are reinforced at a cross member 204 and are coupled to a vehicle frame member 206 at rod ends Heim joints, 208 and 210. For the instant demonstration, inward and outward adjustments can be made at the joints 208 and 210 with adjustment nuts 212 and 214. With the arrangement shown, camber can be adjusted, as in the case of FIG. 4 by selectively turning nut 216 and locking it by tightening nut 218. On the other hand, where caster is adjusted, for example, utilizing nut 214, by adjusting that nut inwardly ball joint 196 will be moved rearwardly and inwardly, such that camber now is affected. On the other hand, nut 214 and/or nut 212 can be adjusted such that ball joint 196 is moved forwardly in the sense of vehicle travel. However, as it moves forwardly, it also moves outwardly, again to change camber. A skilled mechanic is required to carry out a caster/camber adjustment with the arrangement of device 186. Also, there is no technique for determining the instantaneous adjustment for caster. Adjustment at the joints 208 and 210 also can be carried out, for example, with shims.

Figure 6:
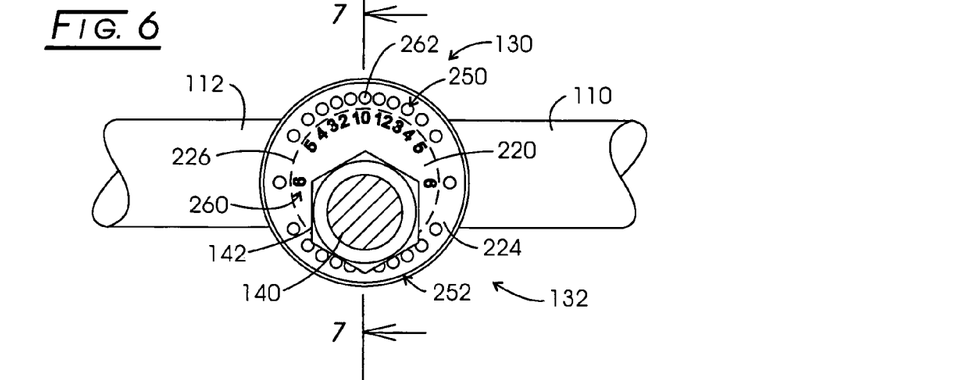
FIG. 6 is a partial front view of a caster/camber adjustment apparatus according to the invention.
Figure 7:
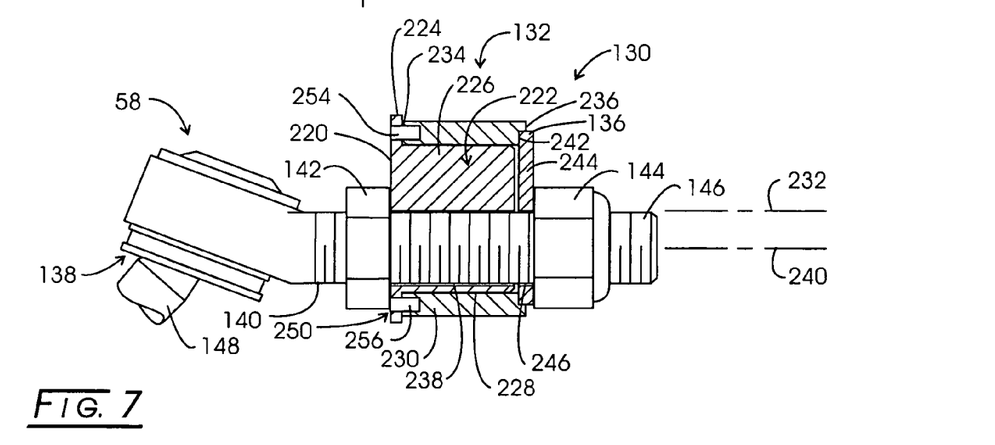
FIG. 7 is a partial sectional view taken through the plane 7-7 shown in FIG. 6.

Referring to FIGS. 6 and 7, the caster/camber apparatus 130 is illustrated at a higher level of detail. In FIG. 6, legs 110 and 112 reappear as they are weldably fixed to apparatus 130. The figure shows threaded stud 140 as it is threadably engaged with jam nut 142. Predominately revealed in the figure is the front or outward surface 220 of a stud support represented in general at 222 in FIG. 7. Front surface 220 is seen to extend radially outwardly to define a flange or flange portion 224. The flange is seen to be integrally formed with a cylindrical support portion 226, the cylindrical profile of which is seen in phantom in FIG. 6. Note in FIG. 7 that the cylindrical support portion 226 of stud support 222 is slidably retained within the cylindrical interior cavity 228 of a generally cylindrically-shaped support member 230. That support member interior cavity 228 is symmetrically disposed about a support axis is seen in FIG. 7 at 232. Additionally, the support member 230 extends between oppositely disposed annular support edges 234 and 236. Stud support 222 is configured to have a cylindrical open eccentric shaft seen in FIG. 7 at 238 having a shaft axis 240 which is parallel with and radially displaced from support axis 232. Note that the shaft 238 is dimensioned to closely slideably receive the threaded stud 140 component of the ball joint assembly.

Inward support edge 236 of support 230 is configured having an annular ledge surface 242 against which a generally disk-shaped retainer member 244 is abuttably associated. Component 244 is configured to rotatably slide along ledge 242 and is formed with a retainer opening 246 which is eccentric and configured to receive a portion of threaded stud 140. Lock nut 144 is threadably engaged with stud 140 and is tightened against retainer 244 such that the combination of nuts 142 and 144 secures stud support 222 and retainer 244 in position. The location of lock nut 144 functions to establish camber as well as to assure that the nut remains in place during vehicle operation.

With the arrangement shown, where stud support 222 and associated retainer 244 are rotated in a counterclockwise direction, negative caster can be provided, correspondingly, when it is rotated in a clockwise direction, positive caster may be provided. To determine the extent of movement and appropriately lock stud support 222 in position following adjustment, an indexing assembly is provided having mutually cooperative components which are adjustably engageable to rotatably position and fix the stud support at one of a plurality of caster-defining orientations. Returning to FIG. 6 one such cooperative component is revealed as an upwardly disposed arcuate array of pin receiving bores represented generally at 250. Located below and in compliment with the array 250 is a downward array of pin receiving bores represented generally at 252. The bores of each of these arrays 250 and 252 are positioned to engage diametrically oppositely disposed pins seen in FIG. 7 at 254 and 256. Pins 254 and 256 are symmetrically disposed about a vertical diameter and engaged with the walls of support member 230 at outward surface 234. Accordingly, the pins are located at a zero caster angle.

FIG. 6 reveals that the individual pin receiving bores of array 250 are each identified with a visually perceptible indicia within an array 260 thereof. In the figure, upwardly disposed pin receiving bore 262 will be engaged with pin 254 and its counterpart within array 252 will be engaged with pin 256. Note that bore 262 is associated with the numeric value "0" within the indicia array 260. When in this 0 location, as noted above, the caster is that associated with the vehicle at the time of its delivery from the vehicle manufacturer. In effect, it is an "OEM" value of caster. To the right of bore 262, the bores are identified with numerical indicia 1-6. These represent adjustment locations for negative caster. Correspondingly, to the left of bore 262 are indicia 1-6 which represent locations for positive caster adjustment. The bores within arrays 250 and 252 are mutually positioned so that moving from one bore to an adjacent one will represent a predetermined constant angular increment of caster. For example, that increment may be about 0.4 degrees. Accordingly, moving stud support 222 with an orientation where the bore adjacent indicia number 6 and its lower counterpart are engaged with the pins 254 and 256 would represent an adjustment of caster of 2.4 degrees.

The making of adjustments for caster does not require the removal of threaded stud 140. Looking to FIG. 8, the orientation of components of apparatus 130 for carrying out adjustment is presented. Note that lock nut 144 has been loosened and threadably backed off from engagement with retainer 244. The nut is not removed. Nut 142 is not rotated so as to maintain preexisting camber. Stud support 222 has been pulled outwardly to release given bores within the arrays 250 and 252 from respective pins 254 and 256. Stud support 222 then is rotated as desired with a concomitant rotation of retainer disc 244.

Figure 8:
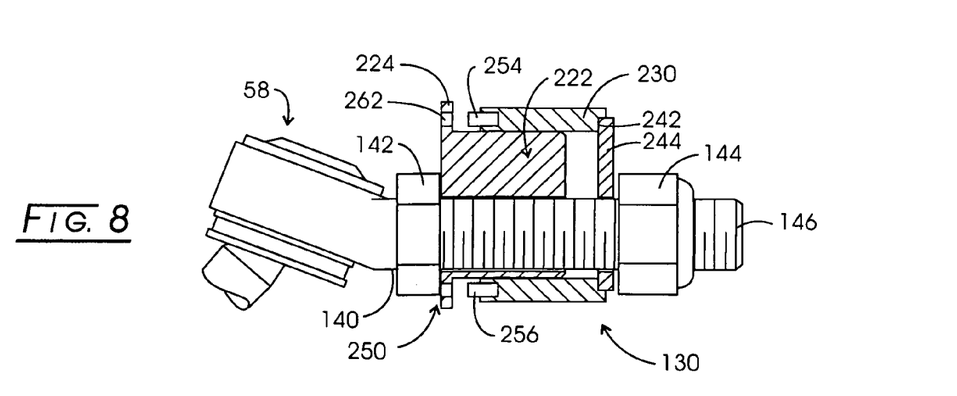
FIG. 8 is a partial sectional view similar to FIG. 7 but showing the components of the caster/camber adjustment apparatus spaced apart for adjustment.

Experience in the field is revealed that operators prefer to make a caster adjustment by leaving the lock nut 144 in position but loosening jam nut 142 to release the stud support 222. As before, stud support 222 then may be rotated with a concomitant rotation of retainer disc 244. Jam nut 142 then is tightened.

Figure 9:
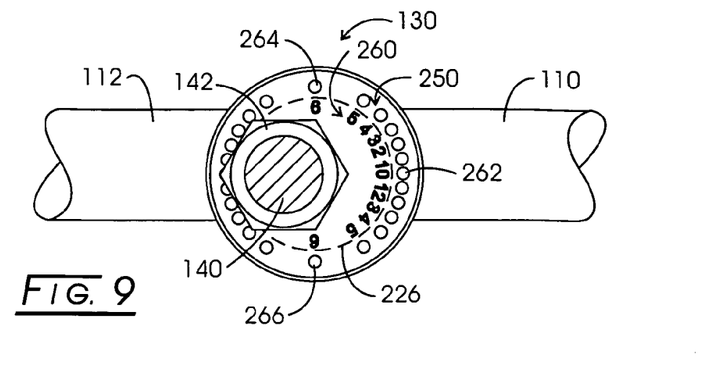
FIG. 9 is a partial front view similar to FIG. 6 but showing a caster adjustment.

FIG. 9 reveals the result of rotating stud support 224 and retainer 244 to the number 6 position in a clockwise manner to provide 2.4 degrees positive caster. Bores 264 and 266 now engage respective pins 254 and 256. Note that the threaded stud 140 has been moved to the left as compared with its orientation in FIG. 6.

Figure 10:
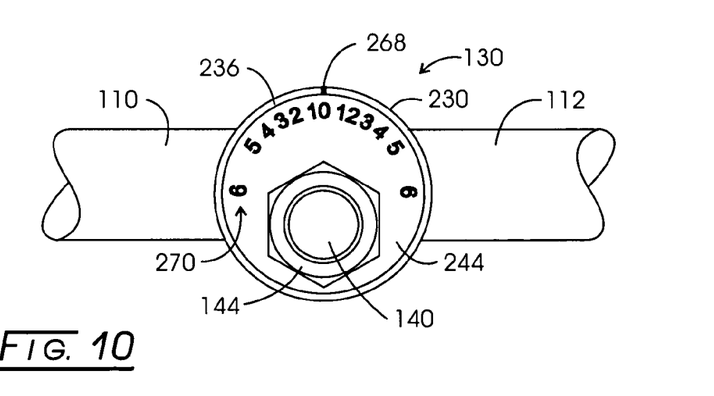
FIG. 10 is a partial rear view of the caster/camber adjustment apparatus of the invention.

As noted above, when stud support 222 is rotatably adjusted, retainer disc 244 also is rotated in correspondence. Looking to FIG. 10, the orientation of retainer disc 244 with respect to the orientation of stud support 222 as shown in FIG. 6 is revealed. Note that the inward edge 236 of support member 230 is configured with a line indicia 268 which is at the zero caster orientation. For convenience to the operator, an array of numeric visually perceptible numeric indicia is provided as represented generally at 270. The numeric data provided in array 270 corresponds with the numeric indicia of array 260.

Figure 11:
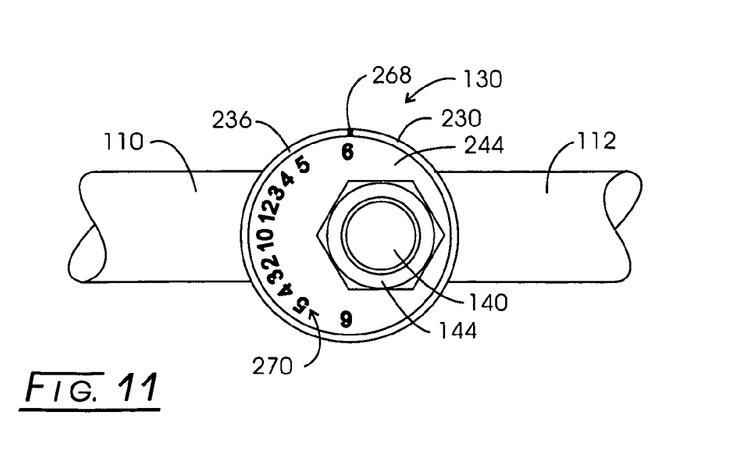
FIG. 11 is a partial rear view of the apparatus of the invention similar to FIG. 10 but showing a caster adjustment corresponding with that of FIG. 9.

Looking to FIG. 11, the orientation of retainer disc 244 corresponding with the orientation shown in FIG. 9 is revealed. In the figure, the numerical indicia 6 is seen to be aligned with line index 268.

Since certain changes may be made in the above apparatus without departing from the scope of the invention herein involved, it is intended that all matter contained in the above description or shown in the accompanying drawings shall be interpreted as illustrative and not in a limiting sense.

The invention claimed is:

1. Apparatus for adjusting the caster and camber of a wheel of an all terrain vehicle which is mounted upon a hub supported from threaded stud mounted ball joints coupled with upper and lower control arms pivotally extending from the frame of the vehicle to attachment locations, comprising:
    a support member fixed to the upper control arm at said attachment location, having a cylindrical interior cavity disposed about a support axis extending between oppositely disposed support edges;
    a stud support having a flange with oppositely disposed flange surfaces and an inward cylindrical support portion slideably insertable within said cylindrical interior cavity and rotatably positionable about said support axis said stud support having a cylindrical open eccentric shaft extending therethrough having a shaft axis parallel with and radially displaced from said support axis when said support portion is located within said cavity and dimensioned to slideably receive the threaded stud;
    a retainer member engageable with said support member, oppositely disposed from said flange, rotatably positionable about said support axis and having a retainer opening corresponding with said eccentric shaft dimensioned to receive said threaded stud;
    an indexing assembly having mutually cooperative components adjustably engageable to rotatably position and fix said stud support at one of a plurality of caster defining orientations; and
    an adjustment nut threadably engaged with the stud and in abutment against the stud support inward cylindrical support portion adjacent the flange.

2. The apparatus of claim 1 in which:
    said stud support flange is configured to engage said support member adjacent a support edge; and
    said indexing assembly is configured to selectably positionably fix said flange to the adjacent support edge.

3. The apparatus of claim 2 in which:
    said indexing assembly cooperative components are configured as a pin assembly fixed to and extending from a said support member edge and a pin receiving bore assembly extending through the said support flange.

4. The apparatus of claim 1 in which:
    said stud support is retainable within said support member interior cavity by said adjustment nut threadably engaged with said threaded stud.

5. The apparatus of claim 1 in which:
    said retainer member is retainable in engagement with said support member by a nut threadably engaged with said threaded stud.

6. The apparatus of claim 1 in which:
    said indexing assembly is configured with said cooperative components defining a zero position, a plurality of negative caster positions, and a plurality of positive caster positions.

7. The apparatus of claim 6 in which:
    said indexing assembly is configured with a visibly perceptible indicia identifying each of said negative caster positions, and each of said positive caster positions.

8. The apparatus of claim 6 in which:
    said indexing assembly is configured to locate each of said plurality of negative caster positions and each of said plurality of positive caster positions to represent a predetermined fixed angular increment of caster.

9. The apparatus of claim 8 in which:
    said angular increment of caster is about 0.4 degree.

10. Apparatus for adjusting the caster and camber of a wheel of an all terrain vehicle which is mounted upon a hub supported from threaded stud mounted ball joints coupled with upper and lower control arms pivotally extending from the frame of the vehicle to attachment locations;
    comprising:
    a support member fixed to the upper control arm at said attachment location having a cylindrical interior cavity symmetrically disposed about a support axis and extending between inward and outward support edges;
    a stud support having a flange fixed to and extending radially outwardly from a cylindrical support portion, said support portion being slideably insertable within said cylindrical interior cavity and rotatably positionable therein about said support axis, said stud support having a cylindrical open eccentric shaft extending therethrough having a shaft axis parallel with and radially displaced from said support axis when said support position is located within said cavity and dimensioned to slideably receive the threaded stud, said flange having an inward surface abuttably locatable against said support member outward support edge;
    a disk-shaped retainer member engageable with said support member at a location adjacent said inward edge, rotatably positionable about said support axis and having a retainer opening with a center radially displaced from said support axis a radial distance corresponding with and alignable with said shaft axis and dimensioned to slideably receive said threaded stud;

an indexing assembly comprising a pin receiving bore defining a zero caster angle formed within said flange, a plurality of negative caster defining pin receiving bores formed within said flange, a plurality of positive caster defining pin receiving bores, and one or more indexing pins depending from said support member outward support edge selectively engageable with a pin receiving bore to define a castor orientation of said stud and said stud support and retainer member are retained upon said support member by an inward nut and an outward nut, each threadably engaged with said stud.

11. The apparatus of claim 10 in which:

the length of the stud and length of said support member along the support axis are effective to release each indexing assembly pin from an associated pin bore by untightening at least one of said inward nut and said outward nut to a release position on the stud.

12. The apparatus of claim 10 in which:

said support member is configured with an annular ledge spaced inwardly from said inward support edge; and said retainer member is slideably positionable upon said annular ledge.

13. The apparatus of claim 10 in which:

said indexing assembly is configured with a visibly perceptible indicia identifying each of said negative caster defining bores and each of said positive caster defining bores.

14. The apparatus of claim 13 in which:

said perceptible indicia is present as a zero adjacent said bore, said plurality of negative castor defining pin receiving bores are identified by a numerical sequence, and said plurality of positive caster defining pin receiving bores are identified by a numerical sequence.

15. The apparatus of claim 14 in which:

said retainer member comprises visibly perceptible indicia corresponding with said perceptible indicia of said indexing assembly; and said support member inward support edge is configured with a marker located in alignment with said one or more indexing pins.

16. The apparatus of claim 10 in which:

said indexing assembly comprises an upwardly disposed array of pin receiving bores defining a zero position, a plurality of negative caster defining pin receiving bores, and a plurality of positive caster defining pin receiving bores;

a downwardly disposed array of pin receiving bores corresponding with said upwardly disposed array; and two diametrically oppositely disposed indexing pins located at said zero caster angle.

17. The apparatus of claim 10 in which:

said indexing assembly is configured to locate each of said pluralities of negative and positive caster defining pin receiving bores to represent a predetermined constant angular increment of caster.

18. The apparatus of claim 17 in which:

said angular increment of caster is about 0.4 degree.

19. The apparatus of claim 18 in which:

said inward nut is a locknut.

\* \* \* \* \*